United States Patent
Xiao et al.

(10) Patent No.: US 9,495,571 B1
(45) Date of Patent: Nov. 15, 2016

(54) TWO-DIMENSIONAL REPRESENTATION OF LINEAR BARCODE DERIVED FROM LASER BARCODE SCANNER SCANLINE DATA

(71) Applicant: Datalogic Automation, Inc., Telford, PA (US)

(72) Inventors: Xiaowei Xiao, Wayne, PA (US); Kenneth Segal, Monte San Pietro (IT)

(73) Assignee: Datalogic Automation, Inc., Telford, PA (US)

( * ) Notice: Subject to any disclaimer, the term of this patent is extended or adjusted under 35 U.S.C. 154(b) by 0 days.

(21) Appl. No.: 14/871,928

(22) Filed: Sep. 30, 2015

(51) Int. Cl.
G06K 7/10 (2006.01)
G06K 7/14 (2006.01)
G06K 19/06 (2006.01)

(52) U.S. Cl.
CPC ......... G06K 7/10722 (2013.01); G06K 7/1491 (2013.01); G06K 19/06037 (2013.01); G06K 19/06112 (2013.01)

(58) Field of Classification Search
CPC ............ G06K 7/10792; G06K 7/10861
USPC .......................... 235/462.01–462.49
See application file for complete search history.

(56) References Cited

U.S. PATENT DOCUMENTS

| | | | |
|---|---|---|---|
| 3,019,292 A | 1/1962 | John | |
| 3,294,903 A | 12/1966 | Goldmark et al. | |
| 3,719,775 A | 3/1973 | Takaoka et al. | |
| 3,919,527 A | 11/1975 | Bowen et al. | |
| 4,239,388 A | 12/1980 | Green | |
| 4,737,650 A | 4/1988 | West | |
| 5,124,538 A | 6/1992 | Lapinski et al. | |
| 5,155,343 A | 10/1992 | Chandler et al. | |
| 5,296,691 A | 3/1994 | Waldron et al. | |
| 5,323,018 A | 6/1994 | Rogers et al. | |
| 5,357,093 A | 10/1994 | Netter et al. | |
| 5,387,787 A | 2/1995 | Waldron et al. | |
| 5,493,108 A | 2/1996 | Cherry et al. | |
| 5,929,421 A | 7/1999 | Cherry et al. | |
| 6,031,225 A | 2/2000 | Stern et al. | |
| 6,193,158 B1 | 2/2001 | Hecht et al. | |
| 6,575,367 B1 | 6/2003 | Longacre, Jr. | |
| 6,742,710 B2 | 6/2004 | De Renzis | |
| 6,857,572 B2 | 2/2005 | Martin et al. | |
| 7,164,810 B2 | 1/2007 | Schnee et al. | |
| 8,360,316 B2 * | 1/2013 | Reichenbach | G06K 7/10792 235/436 |
| 8,594,393 B2 | 11/2013 | Russo | |
| 2008/0230611 A1 | 9/2008 | Sprague et al. | |
| 2010/0027851 A1 | 2/2010 | Walther et al. | |
| 2010/0200660 A1 | 8/2010 | Moed et al. | |

FOREIGN PATENT DOCUMENTS

AT 413452 B 3/2006

\* cited by examiner

*Primary Examiner* — Jamara Franklin
(74) *Attorney, Agent, or Firm* — Stoel Rives LLP; Robert R. Teel

(57) ABSTRACT

Disclosed is a linear barcode scanning system and associated methods for reading a linear barcode borne by an item during transport of the item along a direction of transport by a transport system. A displacement between consecutive scanline samples is determined based on movement imparted to the item from an item-transport system. Image data representing an area of the linear barcode located between positions of the linear barcode corresponding to the consecutive scanline samples is synthesized by quantizing a portion of a first one of the consecutive scanline samples and extending the quantized portion along a direction of the displacement to provide for a depiction of the area of the linear barcode.

22 Claims, 7 Drawing Sheets

TWO-DIMENSIONAL REPRESENTATION OF LINEAR BARCODE DERIVED FROM LASER BARCODE SCANNER SCANLINE DATA

TECHNICAL FIELD

The present disclosure relates generally to laser barcode scanners and, more particularly, to data processing techniques for laser scanline data obtained from such scanners.

BACKGROUND INFORMATION

Laser barcode decoding and diagnostic systems typically employ lower-resolution binarized data of one scan period at a time by first converting from higher-resolution scanline data to a lower-resolution binary sequence. Then, in the more advanced systems, barcode patterns are reconstructed from binarized data of multiple scan periods. For example, when using a laser scanner to read a one-dimensional (i.e., linear) barcode, there are many applications in which modules of the barcode do not line up approximately perpendicularly to the scanline. In such situations, no single scanline encompasses the entire width of the barcode, thereby leaving a portion of the modules excluded from a given sample line of the scanline data. Therefore, decoded portions of binary sequences obtained from multiple scanlines are virtually stitched together in an attempt to generate a sequence that encompasses all of the modules of the barcode. Thus, one-dimensional (i.e., signal) decoding techniques are used to decode the barcode by detecting a sequence of edge transitions within the stitched binarized sequence.

Datalogic Automation Inc. and Accu-Sort Systems, Inc. have attempted one-dimensional barcode information reconstruction by using algorithms known as, respectively, Advanced Code Reconstruction (ACR™ 4) and Data Reconstruction (DRX®). But as noted in the previous paragraph, these algorithms use binarized scanline data to identify known barcode patterns or known barcode behaviors in order to match the data across scanlines. In performing these conventional methods, information is lost before it can be processed. This loss of information reduces the effectiveness of the decoding algorithm and makes diagnostics difficult for anyone but a highly trained technician capable of interpreting the signal (i.e., waveform) information. Because these previous data processing techniques use a linear sequence of edge transitions to determine one-dimensional barcode information, they do not provide for a visual representation of the barcode that could otherwise be used for two-dimensional (i.e., image-based) diagnostic or decoding technologies.

DETAILED DESCRIPTION OF EMBODIMENTS

This detailed description of embodiments includes five subsections. First, an embodiment of a laser barcode scanning system is described to explain how an example system maps scanline data to an image plane by compensating for some or all of the distance to a target surface, laser slant-range variations (i.e., compensation for scanline data density differences attributable to angular sweep of a laser spot across the target surface), and movement of the target surface between temporally spaced apart scanlines. Second, an embodiment of a two-dimensional representation is set forth to explain how the laser scanning system data may be used to synthesize unsampled regions located between consecutive scanlines based on movement of the target surface for a determined distance along a direction of transport. Third, another embodiment of a two-dimensional representation is set forth to explain how the laser scanning system data may be used to synthesize scanline data that compensates for both the movement of the target surface along the direction of transport and a barcode that is angled or tilted with respect to the scanline such that its modules are not exactly perpendicular to the scanline. Fourth, additional examples are described. Fifth, a final section summarizing certain advantages is provided to facilitate a fuller understanding of the embodiments.

Overview of Laser Barcode Scanning System

Figure 1:
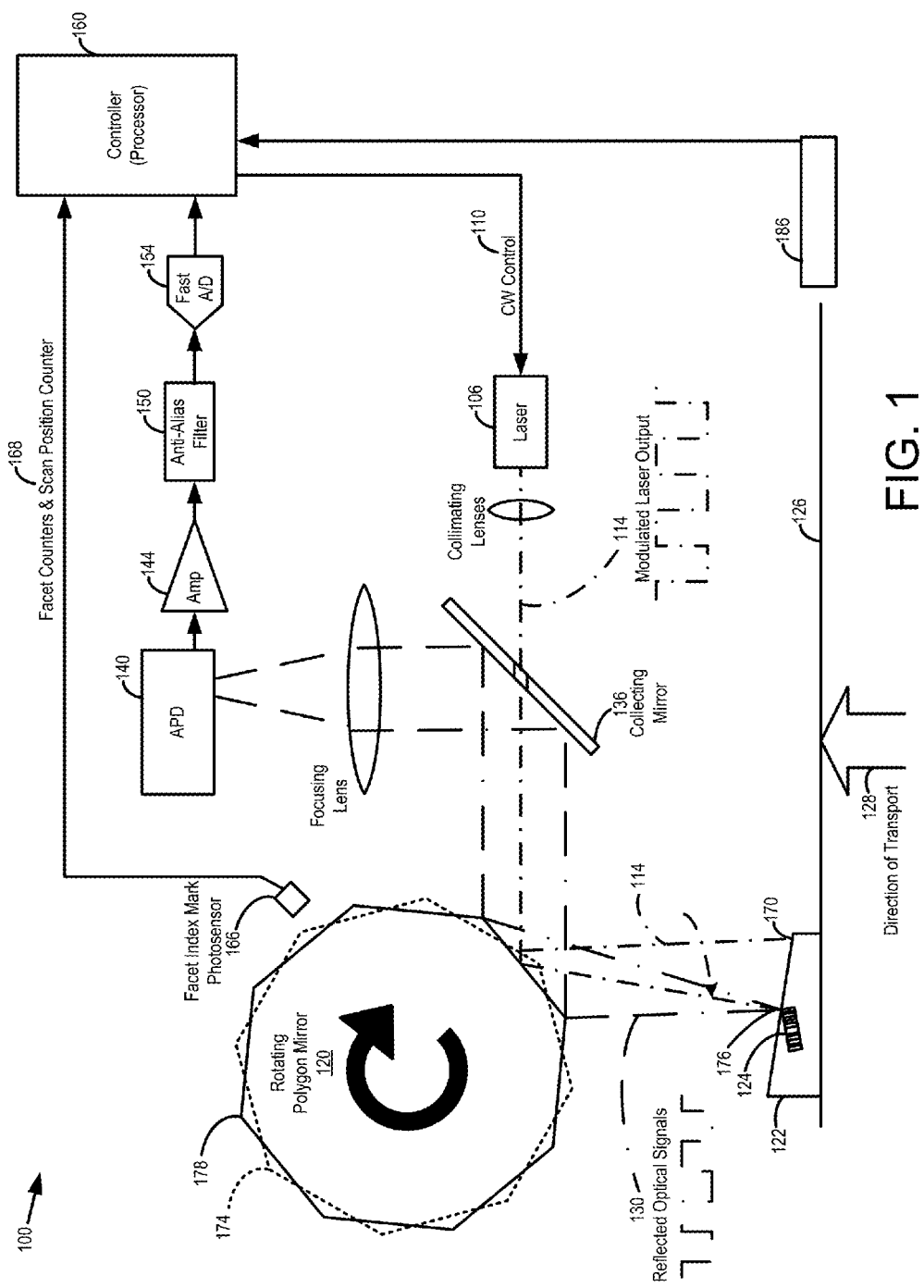
FIG. 1 is a block diagram of a linear barcode scanning system, according to one embodiment.

FIG. 1 shows a laser barcode scanning system 100 that combines several pieces of information to accurately develop a two-dimensional representation based on scanline data and the combined pieces of information. Generally speaking, system 100 derives temporal and three-dimensional positional information associated with sample lines of scanline data so that the scanline data may be effectively mapped to a two-dimensional plane (e.g., an image plane). For example, system 100 may be configured to determine (or may be hardcoded with information concerning) how quickly a laser spot is traveling along the scanline (e.g., angular velocity of a laser spot), how often a scanline period occurs, the distance between the scanner and a given target surface, linear displacement during the time which scanline data is periodically collected for a given target, and magnitude of the signal generated by the light reflected from a given target and received by an optoelectronic light-sensing device of system 100. These five pieces of information may be obtained as follows.

First, angular velocity of a laser spot is usually a fixed value for a system. Second, a scanline period is also usually a fixed parameter. Third, the distance between the scanner and a given target can be hardcoded into the image reconstruction platform. In another embodiment, such as in a case of unspecified distances to a target or in the case of there being multiple targets of different heights occupying the same scanline, the distance can be measured by the laser scanner. Fourth, displacement between scan periods for a different target can be calculated by knowing the velocity with which the target intersects the scan plane. Fifth, magnitude of the received signal may be measured using an avalanche photodiode (APD). After the aforementioned information is captured, an image can be reconstructed using this data. The following paragraphs provide an example.

A continuation wave (CW) laser source 106 receives a CW control signal 110 that modulates a CW laser of source 106 to produce an amplitude-modulated laser output 114. Laser output 114 is then directed by various reflective surfaces of, for example, a rotatable mirror 120 that rotates to sweep a laser spot of laser output 114 laterally across a target surface and thereby form a scanline. The target surface shown in FIG. 1 is on an item 122 bearing a linear barcode 124. As item 122 is transported by a conveyor belt 126 (or other transport system) along a direction of transport 128, barcode 124 is sampled by multiple scanlines established by the several rotating surfaces of rotatable mirror 120. The multiple scanlines are displaced from one another along direction of transport 128 due to the duration of rotation of rotatable mirror 120, movement imparted by conveyor belt 126, and timing of an optional laser emission or reception sampling period.

Laser output 114 is reflected from the target surface as reflected optical signals 130 and is then directed by reflective surfaces of rotatable mirror 120 and a collecting mirror 136 toward an optoelectronic device (e.g., an APD) 140 that converts received optical signals into an electrical signal. This electrical signal is amplified by an amplifier 144, filtered by filter 150, and converted to a digital signal by an analog-to-digital converter (ADC) 154.

A controller 160—which may be any type of processing circuitry including a field programmable gate array (FPGA), application specific integrated circuit (ASIC), programmatically controlled central processing unit (CPU) or microcontroller, or other logic circuitry—demodulates digital scanline data into amplitude and phase information. According to one embodiment, the phase information provides for an estimation of the distance between the target surface and a known reference (e.g., the surface of conveyor belt 126). Because samples of the amplitude information are each obtained at slightly varying angles of incidence of laser output 114 emission, the distance information may be used to digitally zoom or scale the scanline data such that the sample data is manipulated to maintain a consistent samples-per-unit-distance value along the scanline. Optionally digitally zooming or scaling the data in this manner reduces the effect of perspective distortion that would otherwise occur due to laser slant-range effects, summarized as follows.

FIG. 1 shows that scanlines are formed by rotation of rotatable mirror 120. The rotation produces a laser spot that moves across (i.e., laterally) a flat target surface more slowly toward its center position than at its endpoints because the angle of laser reflected from the rotating surface changes as a function (e.g., sinusoid) based on the degree of rotation. Sampling reflections of the laser spot at a constant sample rate would produce a higher density of samples near the center position, and a lower density of samples toward the extremes. In other words, the higher density of samples would cover a relatively shorter surface region, thereby providing a higher samples-per-unit-distance. To compensate for the difference in sample density, a slant-range correction algorithm receives a signal indicating the angular position of rotatable mirror 120, as well as distance information from the signal phase shift, and thereby adjusts the digital scanline data to produce modified data having consistent samples-per-unit-distance value along the scanline. According to one embodiment, a facet index mark photosensor 166 provides a signal 168 indicating the angular position of rotatable mirror 120. In another embodiment, a variable sampling time may be used, in which the sampling time is varied as a function of the degree of rotation or the degree of the angle of incidence.

Another option for distortion correction includes adjusting for sloped or variable-height target surfaces. For example, FIG. 1 shows laser output 114 being swept from a first surface position 170 (corresponding to a first rotational position 174) to a second surface position 176 (corresponding to a second rotational position 178) across a surface that is sloped relative to conveyor belt 126. The slope causes first surface position 170 to be lower than second surface position 176, so without implementing scaling, samples obtained at first surface position 170 would appear to be at a farther distance than those samples obtained at second surface position 176. In other words, the difference in distance would cause a reconstructed image to take on perspective and appear stretched or distorted when mapped to a two-dimensional plane because of the slight difference in distances between these positions. Therefore, the distance measurement is also useful for reducing effects of changes in target surface height.

In some embodiments, distortion compensation is performed directly on scanline data. In other embodiments, distortion compensation is performed on an image representation using, for example, image-processing techniques. Still other embodiments may incorporate distortion compensation on both the scanline and the image data.

Scanline Data Repeating (Linear Displacement Compensation)

Because system 100 has higher resolution in terms of samples-per-unit-distance along the scanline (e.g., horizontal, or perpendicular to the barcode modules), and a lower resolution in terms of samples-per-unit-distance between scanline samples (e.g., vertical, or parallel to the barcode modules), data between scan periods is synthesized (e.g., created or interpolated) to improve image resolution derived from reconstruction of the scanline and synthesized data. To determine how much data (i.e., the number of lines in an image) is to be created to facilitate the reconstruction, the imaging system uses the distance (or velocity times sample time) that the target surface moves across the scan plane. This distance value can be measured from or based on a tachometer 186 or other speed, rotary, or linear distance encoder in communication with conveyor belt 126, perhaps adjusted based on knowledge of the angle of intersection between the scan plane and direction of transport 128 (because when a scanline is not exactly perpendicular to direction of transport 128, the linear separation distance between scanlines is a cosine function of the angle of intersection and transport distance traveled), or set as fixed parameters as these values do not usually vary significantly in a given system.

Figure 2:
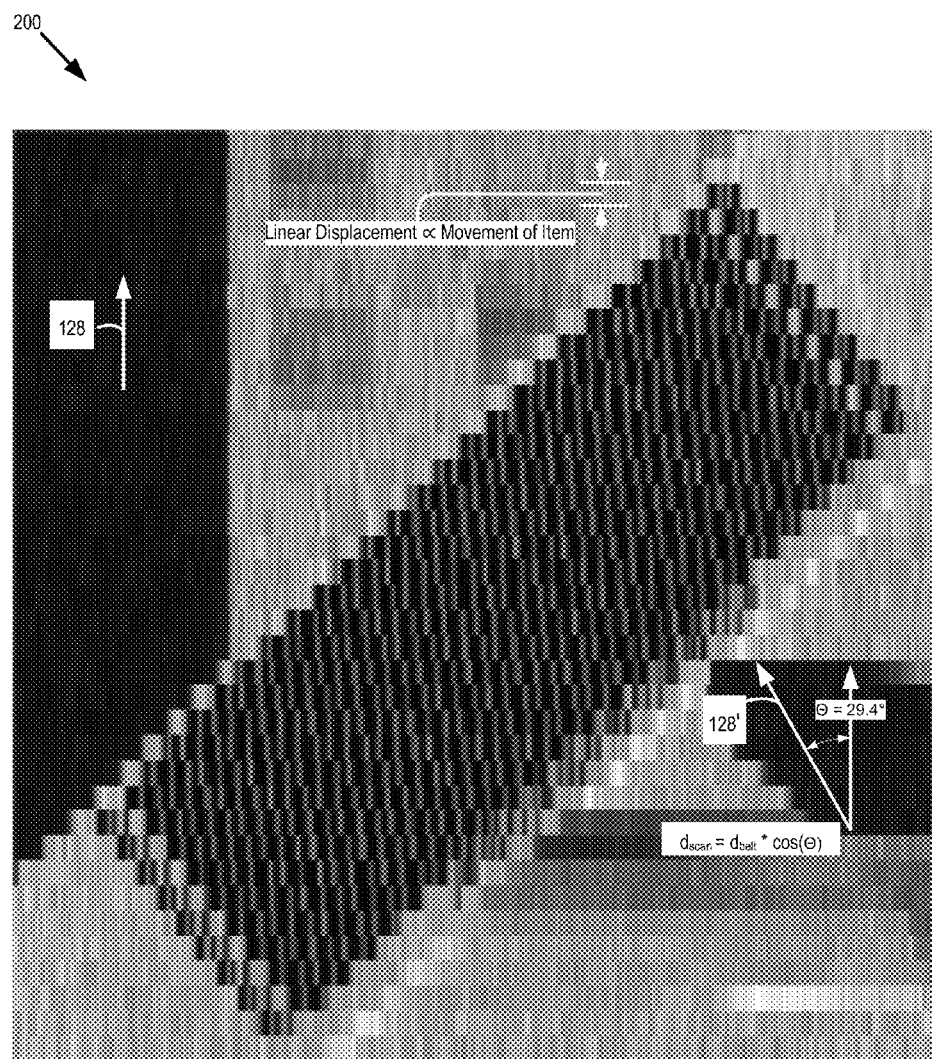
FIG. 2 is an example image generated using scanline repeating.

Compensation for linear displacement attributable to movement along direction of travel is referred to as scanline data repeating, an example of which is shown in FIG. 2. FIG. 2 shows an example of an image representation 200 of a linear barcode, after the appearance of the linear barcode has been reconstructed. FIG. 2 also shows that scanline data is effectively stretched or extended to synthesize the image data between consecutive scanlines, and in which the synthesized image data has an image distance that is proportional to the measured movement of the barcode along a direction of transport 128. The proportional relationship in the example of FIG. 2 is based on a direct relationship between lines per inch (LPI) of movement and dots per inch (DPI) of image data resolution because the example has its scanlines falling exactly perpendicular to the direction of transport 128. Nevertheless, other proportional relationships based on the aforementioned cosine function of an acute or other angle of intersection between directions of transport and scanlines are also contemplated for the purpose of the present disclosure. For example, another direction of transport 128' is shown in FIG. 2 to illustrate how linear scanline separation is calculated when scanlines are angled with respect to direction of transport 128'.

Filtering may optionally be applied to the synthesized data between the scanlines. Note that because a large quantity of data is typically generated and repeated between each scanline, many unwanted artifacts may arise as a result of the reconstruction. For this reason, the information between the scanlines may be filtered to make the transition between scanlines smoother, and reduce sharp unwanted edges. Relatedly, another option is to compress the resulting image data into a smaller file size, without removing too much important information.

Finally, the data can be streamed to an external device that can either store the captured images or display the information for a user to view. The output image quality may or may not be suitable for decoding, but it is typically readily identifiable by a user for rapid visual diagnostic purposes. For example, a user can quickly view the data to recognize the presence or absence of a barcode.

Scanline Data Shifting (Lateral Displacement Compensation)

Where improved image quality is desired in some applications, additional image processing may be deployed. For example, because the barcode represented in FIG. 2 is dramatically angled with respect to a scanline, multiple lines of scanline data, including a common set of modules (i.e., an ROI), will result in a rough depiction of the ROI that shows it as shifting laterally while descending linearly. In other words, movement of the ROI actually has two components: along the scan direction and perpendicular to the scan direction. In these cases, optional motion estimate techniques may be used to compensate for both components of the movement and thereby facilitate improved image quality, as shown in FIG. 3.

Figure 3:
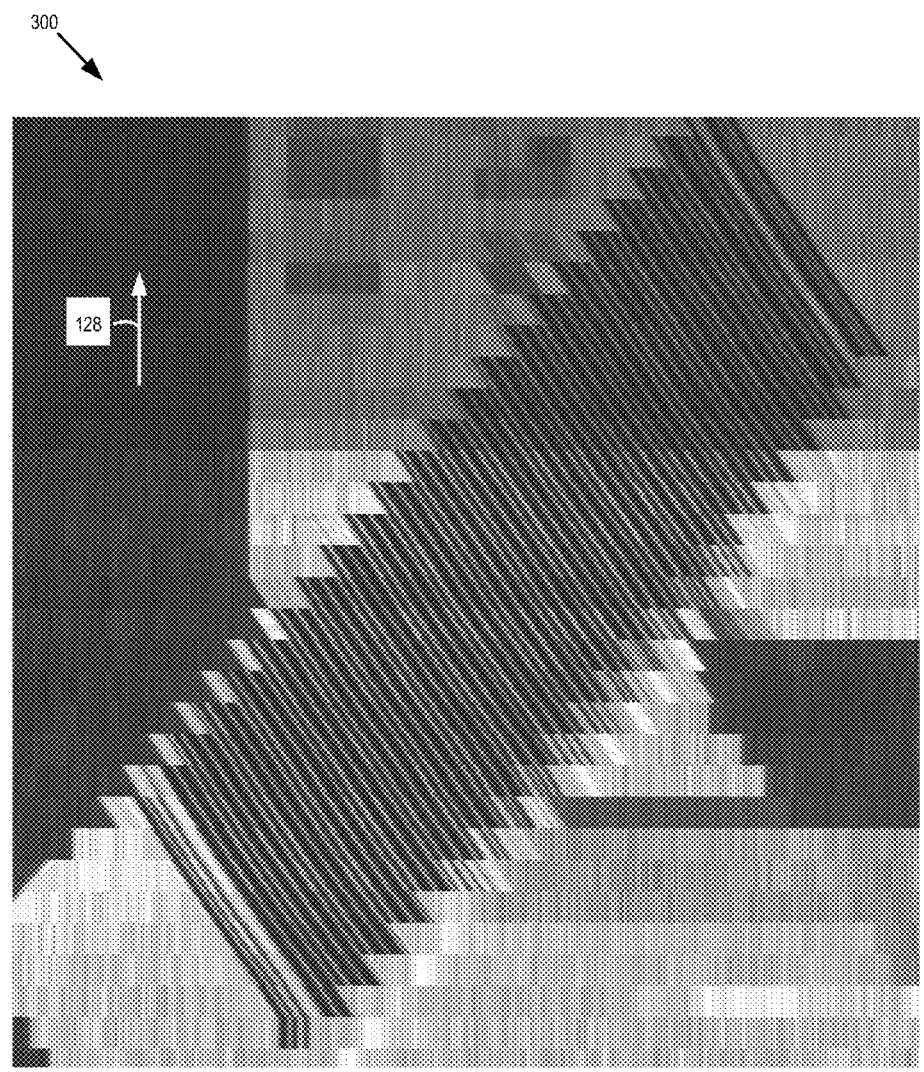
FIG. 3 is an example image generated using scanline shifting to gradually skew a region of interest (ROI) between scanlines.

FIG. 3 shows an example of an image representation 300 of a linear barcode. In fact, image representation 300 represents the same scanline data represented in FIG. 2, but processed using motion estimation techniques described by way of an example shown in FIGS. 4-10. As noted previously, a laser barcode scanner produces uneven resolution between the scan direction and the belt movement direction: it has very high resolution along the scan direction that is used to identify the small bar elements and very low resolution along the belt movement direction that is established by the scan rate and belt speed. One-dimensional barcodes contain repeated information along barcode height and this information redundancy offers the opportunity for barcode motion estimation that is based on how much the relevant and redundant barcode information shifts between scanlines. Based on the barcode motion estimation and repeated information along barcode height, one-dimensional barcodes can be reconstructed from multiple scanlines even when no single scanline contains the barcode in its entirety.

Figure 4:
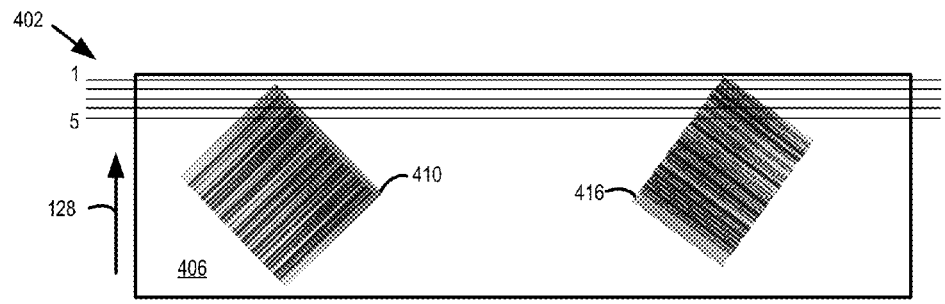
FIG. 4 is a top plan view of a hypothetical item bearing two barcodes, showing a sequence of five scanlines scanning the barcodes as the item is moved along a direction of transport.

FIG. 4 shows a series of five scanlines 402 extending across a surface 406 of an item bearing a left-side linear barcode 410 and a right-side linear barcode 416. Scanlines 402 are generated from a laser spot that sweeps across surface 406 to provide a sequence of scanline data 500 (FIG. 5) as the item is transported through a read zone. (Additional scanlines are omitted for conciseness. Also, surface 406 is shown with its background noise coloration omitted because the focus of this example is on explaining a portion of data obtained from barcode 410 and barcode 416 that is used during motion estimation—background noise is irrelevant in this particular example.)

Figure 5:
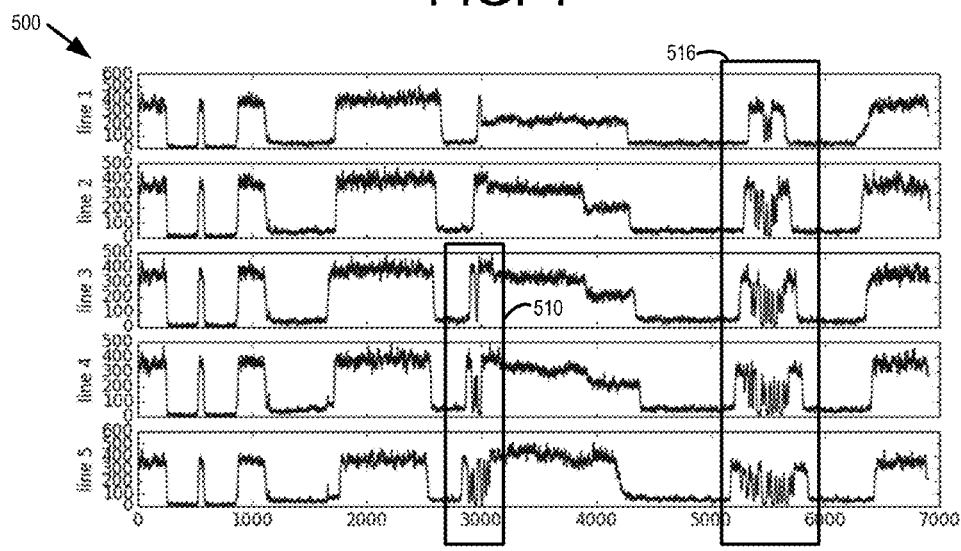
FIG. 5 is sequence of five plots corresponding to scanline data obtained from the five scanlines of FIG. 4
Figure 6:
FIG. 6 is an image of reconstructed barcodes depicting the barcodes of FIG. 4.

FIG. 5 shows scanline data 500 corresponding to five scanlines 402, and within two rectangular annotations are a first one-dimensional ROI 510 that corresponds to data from left-side linear barcode 410 and a second ROI 516 that corresponds to data from right-side linear barcode 416. These ROIs are determined based on a detected threshold number of signal transitions within a predefined window, as explained with reference to FIGS. 7 and 8. Initially, however, before describing the latter drawing figures, it is noted that FIG. 6 shows an image representation 600 of the surface 406, in which barcode 410 and barcode 416 are reconstructed using motion estimation techniques that are based in part on observed movement of ROI 510 among scanline data and of ROI 516 among scanline data. Accordingly, FIG. 6 shows ROI 510 is reconstructed in an area 610, ROI 516 is reconstructed in an area 616, and that these areas include compensation for both linear and lateral movement.

Figure 8:
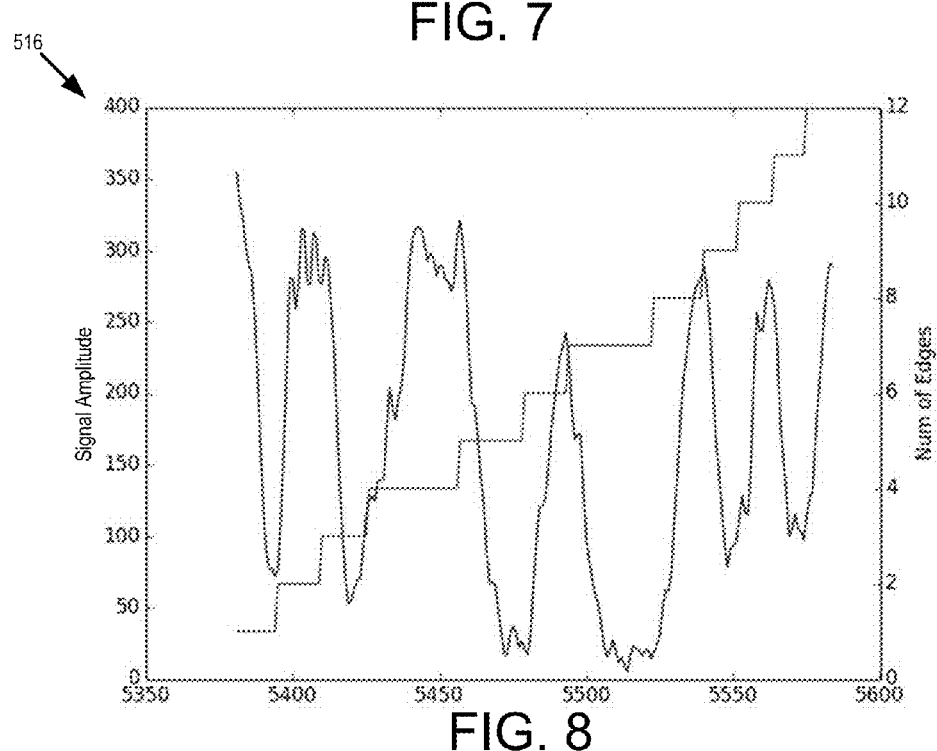
FIG. 8 is a plot of the ROI of FIG. 7, as it appears in a second line of scanline data of FIG. 5.

Turning back to FIGS. 7 and 8, FIG. 7 shows ROI 516 identified in scanline "line 1" data because a portion of the data includes six detected edge transitions, which exceeds a preconfigured threshold number of edges designated as indicative of an ROI. Similarly, FIG. 8 shows ROI 516 identified in scanline "line 2" data because a portion of the data includes 12 detected edge transitions and because the portion is found to fall within a preconfigured number of samples of ROI 516 in the portion of "line 1" data. In other words, ROI 516 appears in "line 2" data within a so-called search window including 64 samples as measured from the start and end points (5458 and 5539, respectively) of ROI 516 in "line 1" data. The search window may be set at any size, as determined based on the geometry of a type of linear barcode, distance between scanlines, and other application-specific parameters. To limit the correlation calculation range described in the following paragraph, belt speed and distance from the scanner are used to calculate the possible maximum offset that defines the size of the search window.

Figure 9:
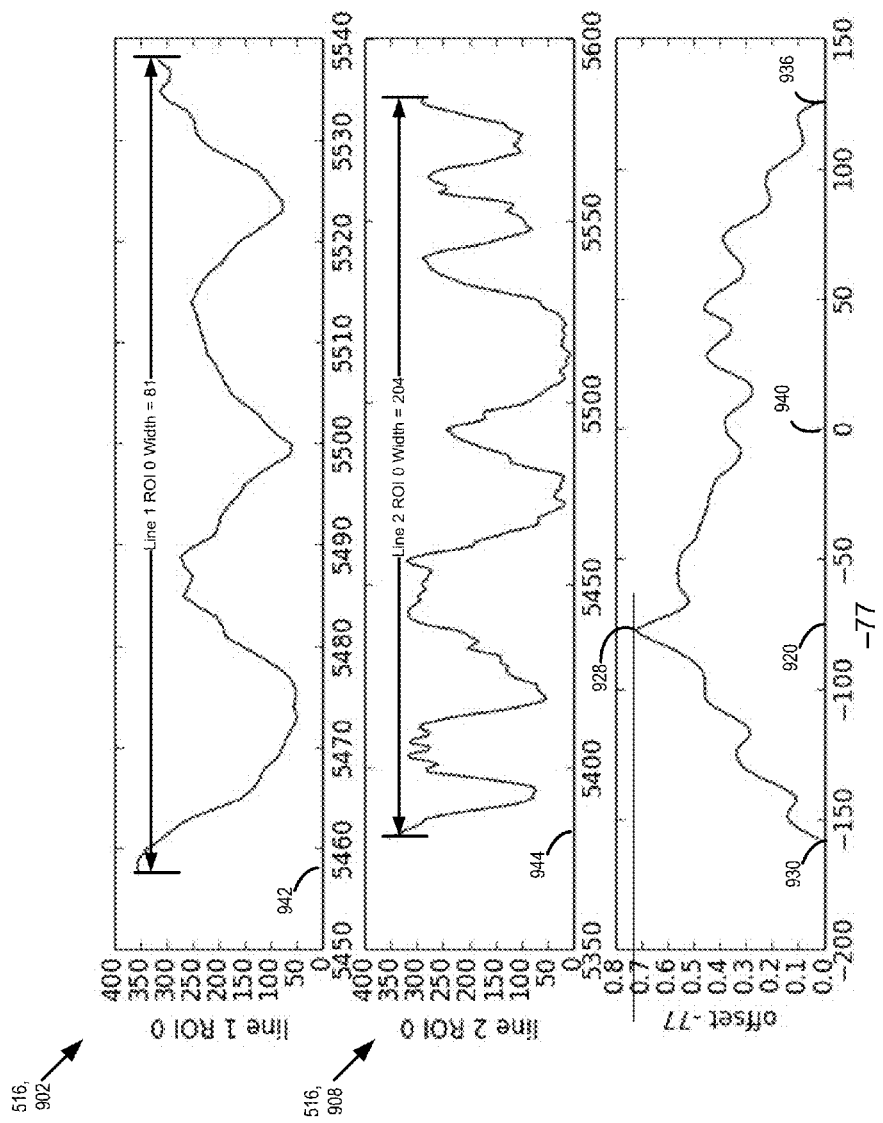
FIG. 9 is a sequence of three plots showing results of a correlation between a common ROI.

FIG. 9 shows how ROI 516 is correlated between "line 1" and "line 2" data because the correlation produces an output value that is proportional to lateral displacement of an ROI between consecutive lines of scanline data. For this reason, the correlation between a common ROI is calculated as follows.

In one embodiment, 81 samples of ROI 902 (which is ROI 516 of "line 1") are convolved with 204 samples of ROI 908 (which is ROI 516 of "line 2"). An x-value 920 at a peak magnitude 928 of the convolution corresponds to the lateral displacement. In this example, x-value 920 is −77. This value is obtained because it is about 81 samples to the right of a leftmost endpoint 930 of the convolution plot and about 204 samples to the left of a rightmost endpoint 936 of the convolution plot. The −157 x-value of leftmost endpoint 930, the +127 x-value of rightmost endpoint 936, and the x-position of a zero midpoint 940 are based on an original offset difference between a starting sample index 942 of ROI 902 (sample number 5,458) and a starting sample index 944 of ROI 908 (sample number 5,381), in which the original offset difference is used to establish the positional framework for peak correlation x-value 920 obtained from the convolution calculation. Specifically, the original offset difference is (coincidently) −77, and this value is used to essentially calibrate the x-position of zero midpoint 940. Then, the convolution calculation results in an initial peak correlation x-value of 0. As we know from the original offset difference that the peak correlation x-value 920 actually occurs at −77 because it is zero (i.e., the initial peak correlation x-value of zero) plus −77 (the original offset difference) away from established midpoint value of zero. Therefore, we know that the actual peak correlation between ROI 902 and ROI 908 occurs at an x-value of −77, under the foregoing positional framework.

As an aside, it is worth pointing out that the x-value 920 of −77 is actually larger than the search window size of 64 because the search window size is based on the average speed of the belt. In operation, however, there is a scaling factor used to enlarge the window of acceptable peak correlation results and thereby compensate for speed variation. For example, according to one embodiment, a scaling factor of 1.25 times the search window size is used to expand the window of acceptable peak correlation results. Thus, a peak correlation x-value having a value in the range of −80 to +80 is acceptable; and the value −77 falls within this range.

Figure 10:
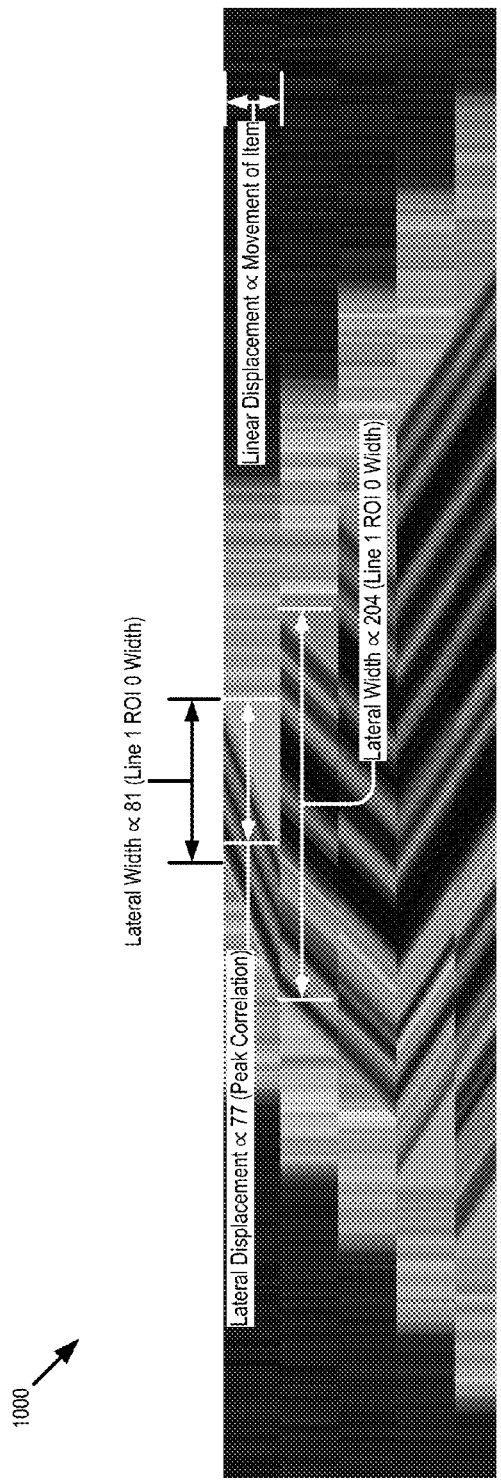
FIG. 10 is an enlarged fragment of the image of FIG. 6.

FIG. 10 shows an enlarged image representation output 1000 corresponding to area 616. In particular, results of peak search and motion estimation determined by the correlation of FIG. 9 are shown in the form of synthesized data in a region between the visual representation of the first and second scanline ROI data. For example, because ROI 908 has been determined to possess a region that is correlated to ROI 902, but is shifted 77 samples to the left of ROI 902, output 1000 therefore depicts ROI 902 as extending from its initial position at scanline "line 1" data to the shifted position at scanline "line 2" data. Other regions that are not correlated are simply extended (repeated) as described previously with reference to FIG. 2. Additional detail of the repeating and shifting techniques are described in the following two corresponding paragraphs.

Scanner sampling speed and distance to the barcode are used to determine the scan resolution, in DPI, along the scan direction, according to the following equation.

$$DPI = \left(\frac{adcSampleFreq}{scanSpeedPerSec}\right) / \left(4.0 * \pi \frac{barDist}{numFacet}\right)$$

where numFacet is a number of facets (i.e., rotating reflective surfaces—eight are shown in FIG. 1); barDist is a distance to a target surface (barcode) as measured from a fixed reference such as a surface of rotatable mirror 120 may provide a reference point for said distance; adcSampleFreq is the scanner ADC sampling frequency; and scanSpeedPerSec is the scan speed per second.

According to one embodiment, to maintain a consistent resolution along the direction of transport, LPI is configured to be the same or proportional to the DPI. Thus, the number of lines to be synthesized between scanlines can be readily calculated based on the belt speed and the mounting orientation of the scanner defining an acute or obtuse angle of intersection between directions of transport and scanlines.

Once the barcode movement between the two scanlines and the number of inserted lines has been determined, a scanline shifting algorithm may be used to calculate an image column-data offset of each inserted portion of image row-data (i.e., the ROI data) and shift the portion by that image column-data offset. In some embodiments, interpolation or extrapolation techniques may be used. In other embodiments, the synthesized data values may be based on interpolation between successive scanlines and thereby form a gradient that blends the values of the data created between the two lines.

Optionally, a reconstructed one-dimensional barcode is fed to the camera decoding engine and test results and examples have shown performance improvement against state-of-the-art reconstruction algorithms in the following cases: higher density code; low contrast; larger depth of field; and poor print quality or damaged barcode.

It is noted that if a barcode is not fully exposed in a particular scanline, such as in a tilted or angled barcode, a global peak correlation position of the correlation might not necessarily correspond to the real barcode movement, especially if there is a repeated pattern in the data or other noise. This phenomenon is shown by way of example in FIG. 10, which shows a change in the slope of the modules beginning at the fourth scanline. At this scanline, there is finally a sufficient amount of data available to produce a peak global correlation that has an (accurate) positive value, not an inaccurate negative one shown initially. In fact, as shown in FIG. 6, the positive angle from the correlation calculations remains consistent for the remainder of the scanlines depicted in FIG. 6. For completeness, however, the local peak correlation values depicted in the example of FIG. 6 are as follows: [−77, −29, −29, 48, 47, 44, 50, 50, 48, 49, 48, 44, 44, 49, 48, 49, 48, 48, 46, 44, 48, 49, 49, 50]. These local peaks also show that the local peak correlation is approximately 48 beginning at the fourth scanline, which is consistent with the actual barcode, barcode 416, shown in FIG. 4.

To address the effects of noise causing false peaks in correlation results, in some embodiments the motion estimation algorithm build a histogram or table of the local peaks produced during the correlation calculations. Then, the amount of barcode lateral motion across multiple scanlines is selected as the mean or median value available from the list of local peaks. In other words, eventually the correlation peak position with the highest occurrence in the histogram is chosen for the barcode lateral motion estimation, and the image representation is developed as a function (e.g., average) of the local peaks. In another embodiment, a moving average is calculated and applied across the scanline data to smooth the transitions between correlation results.

Figure 11:
FIG. 11 is an image of reconstructed barcodes depicting the barcodes of FIG. 4, and showing additional lateral displacement smoothing for improved reconstruction accuracy as compared to that of the image of FIG. 6.
Figure 7:
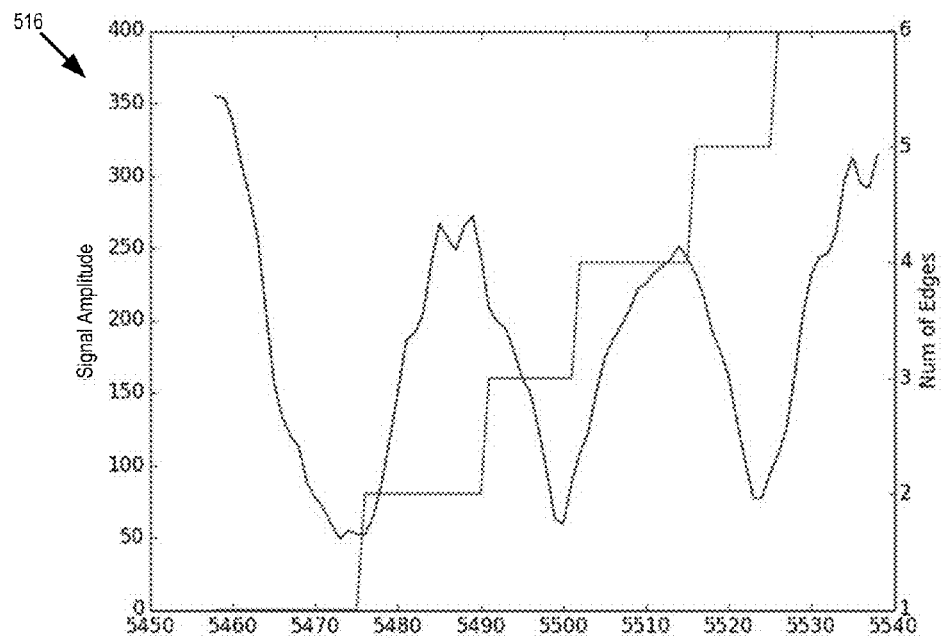
FIG. 7 is a plot of an ROI from a first line of scanline data of FIG. 5.

FIG. 11 shows an image shows an image representation 1100 of the surface 406, in which barcode 410 and barcode 416 are reconstructed using the described motion estimation and peak smoothing techniques. Accordingly, FIG. 11 shows ROI 516 is reconstructed in an area 1116, which has improved accuracy as compared with that of area 616 (FIG. 6). Note that the slope of the upper right side reconstructed modules is consistent, and the slope of all of the modules is generally smoother among the scanlines shown in FIG. 11.

The foregoing smoothing process may be applied during post-processing image analysis (i.e., for use in recordkeeping or human visual inspection), whereas a slightly rougher image representation as shown in FIG. 10 may be prepared line-by-line in real-time during preprocessing for immediate use in a two-dimensional decoder engine or streaming directly to a decoder in real-time.

Furthermore, the results of the correlation also define how a particular ROI is moved through a sequence of scanlines. In some embodiments, therefore, this correlation information may be used to determine actual bounds of the barcode, i.e., the location of the barcode within a larger image representation. The bounds may then be provided to a two-dimensional decoding engine so that the engine can use the bounds to quickly locate relevant barcode data (perhaps ignoring other areas), and thereby accelerate the decode process by focusing the two-dimensional decoding algorithms on the relevant barcode data.

ADDITIONAL EXAMPLES

Example 1

A linear barcode scanning system for reading a linear barcode borne by an item during transport of the item along a direction of transport by a transport system, the system comprising: a laser scanner configured to acquire first scanline data at a first sample time from a first region of the linear barcode and second scanline data at a second sample time from a second region of the linear barcode, in which the second region is spaced apart from the first region along the direction of transport and according to a transport distance imparted from movement of the item by the transport system during a period between the first sample time and the second sample time; a movement sensor configured to determine an amount of the transport distance imparted from movement of the item by the transport system during the period between the first time and the second time; and a processor configured to generate a two-dimensional image depiction of the linear barcode by synthesizing image data representing a third region of the linear barcode that is sized according to the amount of the transport distance and is positioned between the first region and the second region such that the image data representing the third region provides for a depiction of an unsampled area of the linear barcode.

Example 2

The linear barcode scanning system of any other example, in which the transport system comprises a conveyor belt, and in which the movement sensor comprises a belt movement sensor.

Example 3

The linear barcode scanning system of any other example, further comprising a two-dimensional decode engine configured to decode the linear barcode from the two-dimensional image depiction.

Example 4

The linear barcode scanning system of any other example, in which the processor is further configured to synthesize the image data representing the third region by reproducing, for the amount of the transport distance and along the direction of travel, image data values representing the first scanline data so as to visually extend the first scanline data to an image location corresponding to a location of the second scanline data.

Example 5

The linear barcode scanning system of any other example, in which the processor is further configured to: determine a first location of a region of interest in the first scanline data; determine a second location of the region of interest in the second scanline data; and calculate an amount of lateral displacement between the first location and the second location.

Example 6

The linear barcode scanning system of any other example, in which the processor is further configured to synthesize the image data representing the third region by skewing, for the amounts of the transport distance and the lateral displacement and along a direction from the first location to the second location, image data values representing the region of interest so as to visually extend the region of interest from a first image location corresponding to the first location to a second image location corresponding to the second location.

Example 7

The linear barcode scanning system of any other example, in which the processor is further configured to: calculate an amount of lateral displacement between a common region of interest of two scanlines by performing a correlation calculation between the two scanlines; and synthesize the image data representing the third region by skewing, for the amounts of the transport distance and the lateral displacement, image data values representing the common region of interest.

Example 8

The linear barcode scanning system of any other example, in which the processor is further configured to: determine position information of a region of interest identified from multiple consecutive scanlines; and provide the position information of the region of interest to a decoding engine so as to indicate a location of the linear barcode within the two-dimensional image depiction.

Example 9

The linear barcode scanning system of any other example, further comprising a display configured to present the two-dimensional image depiction in response to successfully decoding the linear barcode.

Example 10

The linear barcode scanning system of any other example, further comprising a display configured to present the two-dimensional image depiction in response to completion of an attempt to read the linear barcode.

Example 11

The linear barcode scanning system of any other example, in which the first scanline data includes a region of interest defined by multiple detected edges from modules of the linear barcode.

Example 12

The linear barcode scanning system of any other example, in which the laser scanner is configured to produce scanlines defining an acute or obtuse angle with respect to the direction of transport such that the second region is spaced apart from the first region according to a component of the transport distance.

Example 13

A method of generating a two-dimensional representation of a linear barcode from one-dimensional laser scanline data acquired from an item bearing the linear barcode, the method comprising: determining a displacement between consecutive scanline samples based on movement imparted to the item from an item-transport system; and synthesizing image data representing an area of the linear barcode located between positions of the linear barcode corresponding to the consecutive scanline samples by quantizing a portion of a first one of the consecutive scanline samples and extending the quantized portion along a direction of the displacement to provide for a depiction of the area of the linear barcode.

Example 14

The method of any other example, in which the displacement is a function of a linear distance that the item is conveyed during a sample period between the consecutive scanline samples, and the determining further comprises determining the displacement based on a measure of the linear distance.

Example 15

The method of any other example, in which the direction includes a first component perpendicular to a direction of transport and a second component parallel to the direction of transport, and the extending of the quantized portion comprises propagating the quantized portion along an angle defined be the first component and the second component.

Example 16

The method of any other example, in which the determining further comprises determining lateral displacement by correlating a region of interest between the consecutive scanline samples.

Example 17

The method of any other example, further comprising decoding the linear barcode using two-dimensional decoding operations on the two-dimensional representation.

Example 18

The method of any other example, further comprising displaying the two-dimensional representation in response to detecting the item to provide visual feedback of whether a barcode is present on the item.

Example 19

The method of any other example, further comprising: correlating a region of interest between the consecutive scanline samples; and determining position information associated with the region of interest.

Example 20

The method of example 19, further comprising providing the position information to a two-dimensional decoding engine to identify a location of the linear barcode within the two-dimensional representation.

Example 21

The method of any other example, further comprising: correlating a region of interest between the consecutive scanline samples; and determining lateral displacement based on a location of a peak magnitude of the correlation.

Example 22

The method of any other example, in which the determining further comprises: correlating a region of interest between the consecutive scanline samples to obtain a peak correlation result; repeating the correlating for multiple consecutive scanline samples to obtain a sequence of peak correlation results; and determining lateral displacement as a function of the sequence of peak correlation results.

The example methods have features described in order of convenience, but the described order does not necessarily imply any restriction on an actual implementation of any particular example method. Also, example methods, as well as the configuration of a processor, may be provided in the form of machine-readable instructions that may be stored on a memory so that, when executed, implement a given example method or cause a processor to perform any of the aforementioned features described in this disclosure.

Summary of Advantages

A two-dimensional digital imaging system for laser barcode scanners is a platform that can be used to generate a visual representation of moving objects that are scanned by the scanner. By creating a two-dimensional representation (e.g., a digital image) from scanline data before it has been binarized, there is a potential for improvement in decode performance attributable to processing of higher-resolution data and availability of advanced two-dimensional image decoding techniques, including virtual scanlines that sample an image across any number of configurable orientations.

A two-dimensional representation also allows for simpler diagnostics by creating a high-quality visual object for a human to visually observe and intuitively interpret, as opposed to working with a sequence of waveform diagrams representing scanline data. Thus, this disclosure provides an improved diagnostic capability for customers and technicians to use with (conventional) laser-based systems in new or retrofit applications, while also providing a platform by which to improve barcode decoding performance.

The two-dimensional images built using techniques set forth in this disclosure provide for jitter correction that allows linear barcodes to be decoded at a wide depth of field, and the images may be used for object recognition purposes. For example, airport authorities may provide the images as visual evidence (in addition to read barcode information) that a baggage item bearing the barcode was present at a certain location at a certain time, thus improving customer satisfaction and reducing lost-baggage claims.

As an aside, the term image, as it is used in this disclosure, is a shorthand expression for visual representation that may include a digital image file formatted according to one of many image-format standards; raw image data stored as a matrix, array, or other data structure; or any other conceivable form of digital or analog visual representation whether stored in memory, temporarily displayed, or fixed in some form of tangible medium.

Further, the techniques described in this disclosure allow for producing two-dimensional images that are comparable in quality, for purposes of two-dimensional decoding, to images obtained from a charge-coupled device (CCD) imager of an imager-based optical code reading system. In other words, decoding may be performed on a fully reconstructed two-dimensional profile instead of on partly decoded fragments that are stitched together after partial decoding. This allows for optionally bypassing conventional linear barcode reconstruction steps.

A one-dimensional barcode reconstruction algorithm estimates the one-dimensional barcode movement and then interpolates between the scanlines to reconstruct the barcode. It need not rely on any advance knowledge or awareness of the barcode patterns or geometry. Thus, the disclosed techniques decouple barcode reconstruction from barcode decoding. Furthermore, the techniques use only the signal itself and can be implemented at different data resolutions. Data resolution of a barcode in a one-dimensional signal can change with the sampling rate of an ADC or the scan rate of the system. For example, using a higher sampling rate, or a lower scan rate, will produce a higher number of data points captured from light reflected by a barcode, which thereby increases signal resolution. By knowing the sampling rate and scan rate (which are typically constant), sampling rate and scan rate (or more specifically, angular velocity), the disclosed reconstruction techniques may be successfully deployed. Thus, the technology opens the opportunities for the decoding algorithm improvement, including an improved binarization algorithm based on multiple scanlines or use of a camera (i.e., two-dimensional) decoding engine for a laser scanner.

Regarding the improved binarization algorithm, there are a few ways used to binarize a one-dimensional signal to attempt to extract barcode information. One of the ways is applying a static threshold to a region that has been deemed of interest. Another is to use an adaptive threshold that constantly changes depending on the local peak-to-peak signal strength within regions of interest in a barcode. The drawback of these techniques is that they are limited to having knowledge of only the current scan line, just parts of the current scan line, or some similar real-time dynamic information. As a consequence, these techniques operate on an incomplete representation of a small portion of a barcode, and are therefore highly susceptible to noise that swamps the small portion. But by having multiple scan lines worth of information available within an image representation, it is possible to use image processing techniques to reduce the noise because the noise becomes a small factor that is readily apparent in view of a more complete picture of highly redundant barcode information.

The disclosed embodiments generate a high-resolution image from the information that is processed by a laser barcode scanner. Disclosed algorithms estimate the barcode motion and reconstruct the barcode before the binarization so the decoder will have more information, which will result in improved performance. With prior attempts, in order to obtain an image for diagnostics or processing in industrial barcode scanning, an expensive (now possibly redundant) camera would be used in conjunction with the system.

Laser barcode scanners also have an advantage for imaging in that the depth of field of the focal point is much higher than that of an imager (CCD). This allows multiple targets in a single scanline to appear in focus in the resulting image even when the targets are located at different distances from the laser scanner. Laser scanners also tend to be much less expensive than imagers used for a similar purpose.

In summary, this disclosure describes performance improvement of a laser scanner. Additional aspects and advantages should be apparent to skilled persons. Such skilled persons will understand that many changes may be made to the details of the above-described embodiments without departing from the underlying principles of the invention. For example, the embodiments may be used with other types of optical codes, such as, for example, two-dimensional optical codes. The scope of the present invention should, therefore, be determined only from the following claims.

The invention claimed is:

1. A linear barcode scanning system for reading a linear barcode borne by an item during transport of the item along a direction of transport by a transport system, the system comprising:
   a laser scanner configured to acquire first scanline data at a first sample time from a first region of the linear barcode and second scanline data at a second sample time from a second region of the linear barcode, in which the second region is spaced apart from the first region along the direction of transport and according to a transport distance imparted from movement of the item by the transport system during a period between the first sample time and the second sample time;
   a movement sensor configured to determine an amount of the transport distance imparted from movement of the item by the transport system during the period between the first time and the second time; and
   a processor configured to generate a two-dimensional image depiction of the linear barcode by synthesizing image data representing a third region of the linear barcode that is sized according to the amount of the transport distance and is positioned between the first region and the second region such that the image data representing the third region provides for a depiction of an unsampled area of the linear barcode.

2. The linear barcode scanning system of claim 1, in which the transport system comprises a conveyor belt, and in which the movement sensor comprises a belt movement sensor.

3. The linear barcode scanning system of claim 1, further comprising a two-dimensional decode engine configured to decode the linear barcode from the two-dimensional image depiction.

4. The linear barcode scanning system of claim 1, in which the processor is further configured to synthesize the image data representing the third region by reproducing, for the amount of the transport distance and along the direction of travel, image data values representing the first scanline data so as to visually extend the first scanline data to an image location corresponding to a location of the second scanline data.

5. The linear barcode scanning system of claim 1, in which the processor is further configured to:
   determine a first location of a region of interest in the first scanline data;
   determine a second location of the region of interest in the second scanline data; and
   calculate an amount of lateral displacement between the first location and the second location.

6. The linear barcode scanning system of claim 5, in which the processor is further configured to synthesize the image data representing the third region by skewing, for the amounts of the transport distance and the lateral displacement and along a direction from the first location to the second location, image data values representing the region of interest so as to visually extend the region of interest from a first image location corresponding to the first location to a second image location corresponding to the second location.

7. The linear barcode scanning system of claim 1, in which the processor is further configured to:
   calculate an amount of lateral displacement between a common region of interest of two scanlines by performing a correlation calculation between the two scanlines; and
   synthesize the image data representing the third region by skewing, for the amounts of the transport distance and the lateral displacement, image data values representing the common region of interest.

8. The linear barcode scanning system of claim 1, in which the processor is further configured to:
   determine position information of a region of interest identified from multiple consecutive scanlines; and
   provide the position information of the region of interest to a decoding engine so as to indicate a location of the linear barcode within the two-dimensional image depiction.

9. The linear barcode scanning system of claim 1, further comprising a display configured to present the two-dimensional image depiction in response to successfully decoding the linear barcode.

10. The linear barcode scanning system of claim 1, further comprising a display configured to present the two-dimensional image depiction in response to completion of an attempt to read the linear barcode.

11. The linear barcode scanning system of claim 1, in which the first scanline data includes a region of interest defined by multiple detected edges from modules of the linear barcode.

12. The linear barcode scanning system of claim 1, in which the laser scanner is configured to produce scanlines defining an acute or obtuse angle with respect to the direction of transport such that the second region is spaced apart from the first region according to a component of the transport distance.

13. A method of generating a two-dimensional representation of a linear barcode from one-dimensional laser scanline data acquired from an item bearing the linear barcode, the method comprising:
   determining a displacement between consecutive scanline samples based on movement imparted to the item from an item-transport system; and
   synthesizing image data representing an area of the linear barcode located between positions of the linear barcode corresponding to the consecutive scanline samples by quantizing a portion of a first one of the consecutive scanline samples and extending the quantized portion along a direction of the displacement to provide for a depiction of the area of the linear barcode.

14. The method of claim 13, in which the displacement is a function of a linear distance that the item is conveyed during a sample period between the consecutive scanline samples, and the determining further comprises determining the displacement based on a measure of the linear distance.

15. The method of claim 13, in which the direction includes a first component perpendicular to a direction of transport and a second component parallel to the direction of transport, and the extending of the quantized portion comprises propagating the quantized portion along an angle defined be the first component and the second component.

16. The method of claim 13, in which the determining further comprises determining lateral displacement by correlating a region of interest between the consecutive scanline samples.

17. The method of claim 13, further comprising decoding the linear barcode using two-dimensional decoding operations on the two-dimensional representation.

18. The method of claim 13, further comprising displaying the two-dimensional representation in response to detecting the item to provide visual feedback of whether a barcode is present on the item.

19. The method of claim 13, further comprising:
   correlating a region of interest between the consecutive scanline samples; and
   determining position information associated with the region of interest.

20. The method of claim 19, further comprising providing the position information to a two-dimensional decoding engine to identify a location of the linear barcode within the two-dimensional representation.

21. The method of claim 13, further comprising:
   correlating a region of interest between the consecutive scanline samples; and
   determining lateral displacement based on a location of a peak magnitude of the correlation.

22. The method of claim 13, in which the determining further comprises:
   correlating a region of interest between the consecutive scanline samples to obtain a peak correlation result;
   repeating the correlating for multiple consecutive scanline samples to obtain a sequence of peak correlation results; and
   determining lateral displacement as a function of the sequence of peak correlation results.

\* \* \* \* \*

UNITED STATES PATENT AND TRADEMARK OFFICE
CERTIFICATE OF CORRECTION

PATENT NO.          : 9,495,571 B1
APPLICATION NO.     : 14/871928
DATED               : November 15, 2016
INVENTOR(S)         : Xiaowei Xiao et al.

Page 1 of 1

It is certified that error appears in the above-identified patent and that said Letters Patent is hereby corrected as shown below:

In the Specification

Column 1
Line 67, add a --.-- at the end of the sentence.

Column 8
Line 43, change "build" to --builds--.
Line 54, delete second instance of "shows an image".

Column 11
Line 36, change "be" to --by--.

Column 13
Line 25, delete "sampling rate".
Line 26, delete "and scan rate".
Line 26, remove "( )" around "or more specifically, angular velocity".

In the Claims

Column 16
Line 14, change "be" to --by--.

Signed and Sealed this
Fourteenth Day of February, 2017

Michelle K. Lee
*Director of the United States Patent and Trademark Office*